(12) United States Patent
Nomura et al.

(10) Patent No.: US 6,368,371 B1
(45) Date of Patent: Apr. 9, 2002

(54) TRAP DEVICE AND TRAP SYSTEM

(75) Inventors: Norihiko Nomura; Nobuharu Noji, both of Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/485,616

(22) PCT Filed: Jan. 21, 1999

(86) PCT No.: PCT/JP99/00204

§ 371 Date: Feb. 14, 2000

§ 102(e) Date: Feb. 14, 2000

(87) PCT Pub. No.: WO99/37919

PCT Pub. Date: Jul. 29, 1999

(30) Foreign Application Priority Data

Jan. 22, 1998 (JP) ............................................. 10-025041
Feb. 16, 1998 (JP) ............................................. 10-050194

(51) Int. Cl.[7] ............................................. B01D 45/08
(52) U.S. Cl. ............................................. 55/309; 55/440
(58) Field of Search ................................ 55/309, 434.2, 55/440, DIG. 15; 62/55.5

(56) References Cited

U.S. PATENT DOCUMENTS 3,474,634 A * 10/1969 Kohler et al. ................. 62/55.5
5,316,213 A * 5/1994 Gooderham ................... 236/58

FOREIGN PATENT DOCUMENTS

| JP | 58-101723 | * 6/1983 | .................. 55/440 |
|----|-----------|----------|--------------------------|
| JP | 58-106186 | 6/1983 | |
| JP | 60-6087 | 1/1985 | |
| JP | 60-71002 | 4/1985 | |
| JP | 63-299036 | 12/1988 | |
| JP | 1-266802 | 10/1989 | |
| JP | 10-125607 | 5/1998 | |

* cited by examiner

*Primary Examiner*—Robert A. Hopkins
(74) *Attorney, Agent, or Firm*—Armstrong, Westerman & Hattori, LLP

(57) ABSTRACT

The present invention provides a trap apparatus which is capable of increasing the trapping efficiency while fulfilling a conductance allowed by a vacuum chamber in a depositing process or the like, for thereby increasing the service life of a vacuum pump and protecting a toxic substance removing device for increased operation reliability, and reducing equipment and running costs. The trap apparatus has a trap unit (18) disposed in a discharge passage (14) for discharging therethrough a gas from a vacuum chamber (10) with a vacuum pump (12) for trapping and removing a product in a discharged gas. The trap unit (18) has trap passages comprising an upstream passage portion (44) spreading outwardly from the center and a downstream passage portion (42) directed inwardly toward the center.

4 Claims, 13 Drawing Sheets

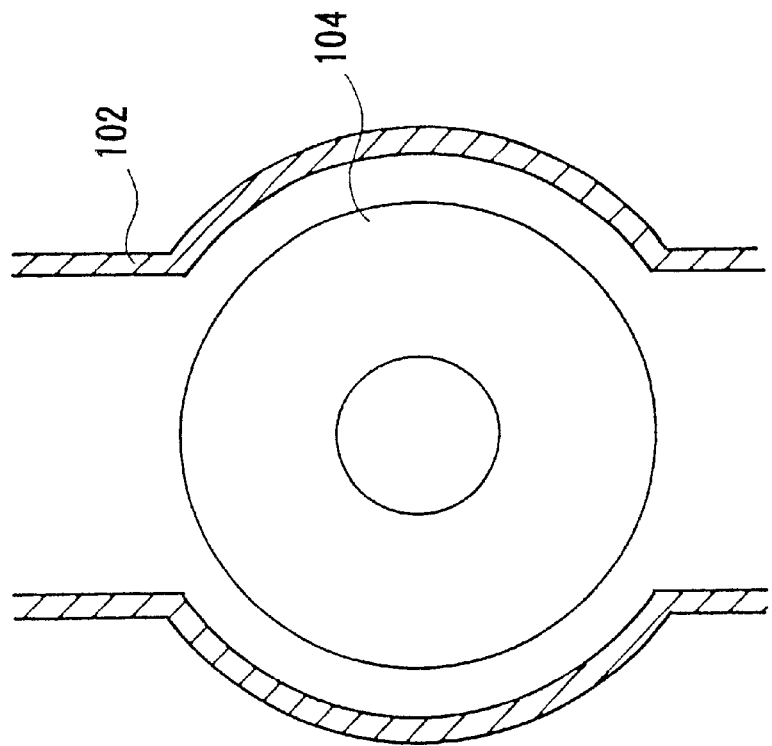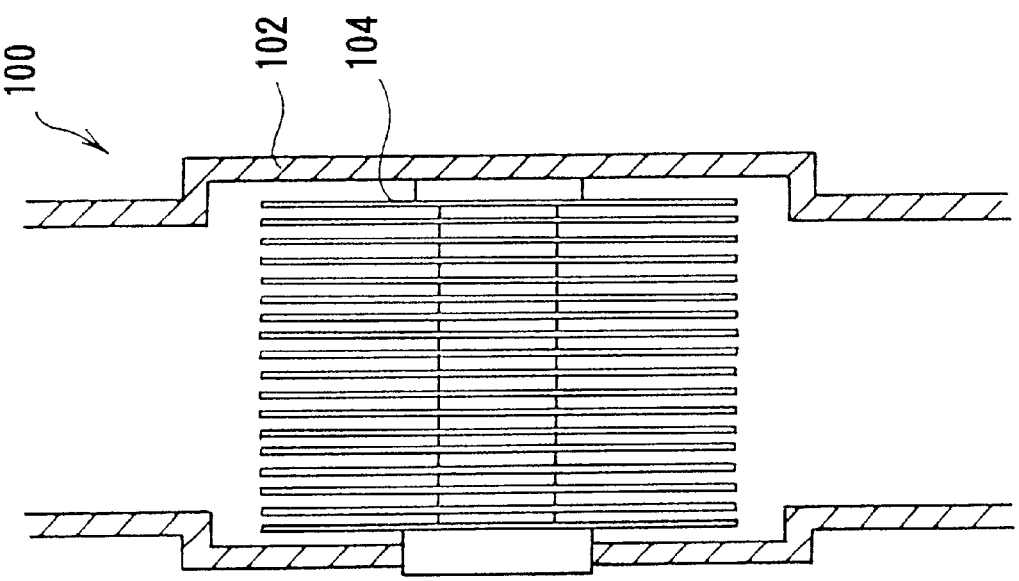

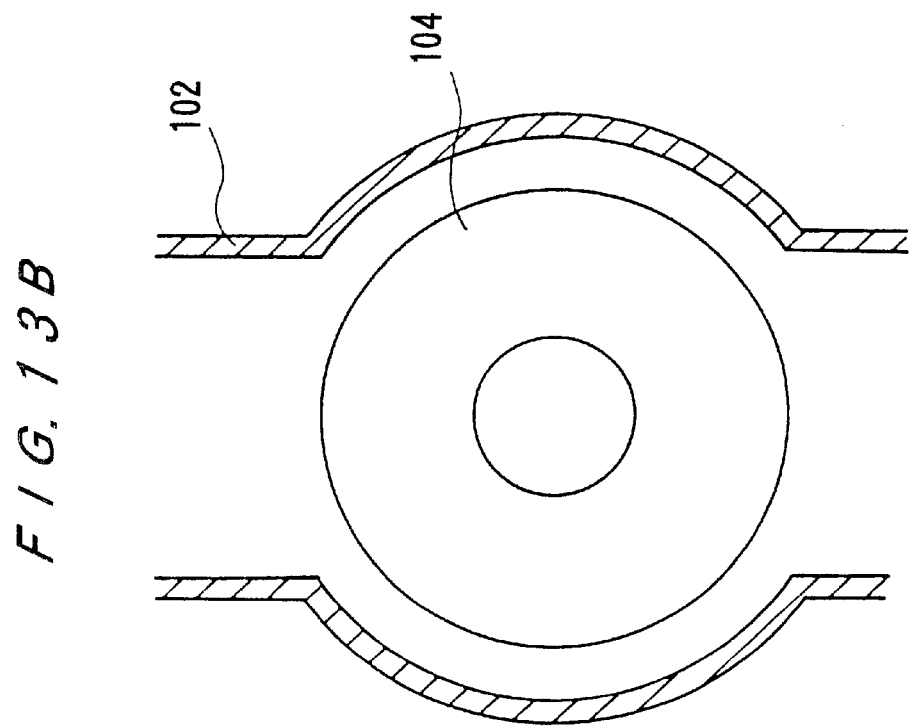
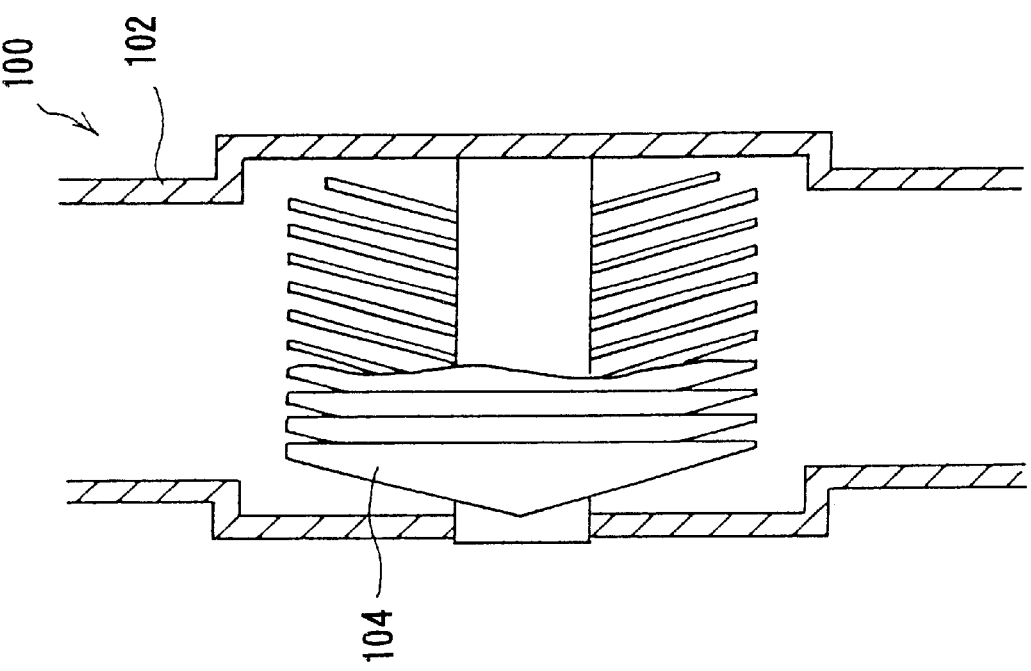

TRAP DEVICE AND TRAP SYSTEM

TECHNICAL FIELD

A conventional evacuating system will be described below with reference to FIG. 11. In FIG. 11, a vacuum chamber 10 comprises a process chamber for use in a semiconductor fabrication process such as an etching apparatus or a chemical vapor deposition (CVD) apparatus, and is connected to a vacuum pump 12 through a discharge pipe 14. The vacuum pump 12 serves to increase the pressure of gases discharged from the process to the atmospheric pressure. The vacuum pump 12 has heretofore been composed of an oil rotary pump, but mainly comprises a dry pump at present. If the level of vacuum required by the vacuum chamber 10 is higher than the level of vacuum that can be produced by the vacuum pump 12, an ultra-high vacuum pump such as a turbo-molecular pump may be disposed upstream of the dry pump.

The gases discharged from the process cannot directly be discharged into the atmosphere because they may be toxic or explosive depending on the type of the process. Therefore, a discharge processing apparatus 20 is disposed downstream of the vacuum pump 12. Of the gases discharged from the process, whose pressure has been increased to the atmospheric pressure, those gases that cannot directly be discharged into the atmosphere are treated by a process such as adsorption, decomposition, absorption by the discharge processing apparatus 20, from which only harmless gases are discharged into the atmosphere. Necessary valves are provided at appropriate locations of the pipe 14.

The conventional evacuating system is disadvantageous in that if a substance having a high sublimation temperature is contained in the reaction by-products, then since the gas of the substance is discharged by the vacuum pump, the gas is solidified while its pressure is being increased, and deposited in the vacuum pump, thus tending to cause a failure of the vacuum pump.

For example, if $BCl_3$ or $Cl_2$ which is a typical process gas for aluminum etching is used, then the process chamber discharges the remainder of the process gas of $BCl_3$ or $Cl_2$ and a reaction by-product of $AlCl_3$ via the vacuum pump. $AlCl_3$ is not deposited in the suction side of the vacuum pump because its partial pressure is low. However, while $AlCl_3$ is being discharged under pressure, its partial pressure rises, and it is deposited, solidified, and attached to the inner pump wall, resulting in a failure of the vacuum pump. The same problem occurs with reaction by-products of $(NH_4)_2SiF_6$ and $NH_4Cl$ that are produced from a CVD apparatus for depositing films of SiN.

It has heretofore been attempted to heat the vacuum pump in its entirety to pass the reaction by-products in a gaseous state through the vacuum pump so that no solid substance is deposited in the vacuum pump. The attempt has been effective to prevent a solid substance from being deposited in the vacuum pump, but has been problematic in that a solid substance is deposited in the discharge processing apparatus disposed downstream of the vacuum pump, thereby clogging a filled layer in the discharge processing apparatus.

One solution is to install a trap apparatus upstream or downstream of the pump for trapping products for removal of components which will generate solid substances for thereby protecting various devices provided at the discharge pipe. It is conceivable that as shown in FIGS. 12 and 13, such trap apparatus 100 has a hermetically sealed container 102 disposed in a discharge pipe and forming part thereof, with plate-like baffles 104 (a trap unit) housed therein. When a certain amount of deposited material is attached to the baffles 104, the discharge passage is switched to another discharge passage, and the trap unit is cleaned or replaced for continuous processing.

However, the conventional trap apparatuses are poor in trapping efficiency, and most components of discharged gases flow without being attached to the trap unit and are attached to downstream pipes and devices. This is because the baffles 104 comprise parallel plates and the trap unit is not brought into sufficient contact with the discharged gases.

If the baffle plates are of a complex shape, then they trap components of discharged gases partly, the conductance is extremely lowered, the baffle plates cause clogs which make the flow of discharged gases unstable, the trap unit cannot smoothly be replaced or switched over, and the trap apparatus is structurally so complex that its manufacturing and maintenance costs will be increased.

DISCLOSURE OF INVENTION

The present invention has been made in view of the above drawbacks. It is an object of the present invention to provide a trap apparatus which is capable of increasing the trapping efficiency while fulfilling a conductance allowed by a vacuum chamber in a film depositing process or the like, for thereby increasing the service life of a vacuum pump and protecting a toxic substance removing device for increased operation reliability, and reducing equipment and running costs.

Since a trapped solid substance is accumulated in a trap unit of a trap apparatus, it is necessary to replace the trap unit or remove the solid substance according to a predetermined process for regenerating the trap unit after elapse of a certain time. The replacement of the trap unit needs to prepare many trap units, and cannot easily be automatized.

One solution would be to provide a regenerating passage disposed adjacent to the discharge pipe 14 for the passage of a warm water heated to a predetermined temperature, for example, and to shift the trap unit between the discharge passage and the regenerating passage for alternately performing a trapping action and a regenerating action for automatic operation.

However, such a trap apparatus would be required to have a heating means such as a heater and ancillary equipment for generating the warm water for cleaning the trap unit, resulting in an increase in the equipment cost such as due to the occupation of a floor of a clean room. Furthermore, if the warm water were continuously circulated, the warm water (cleaning liquid) would be contaminated and the cleaning efficiency would be lowered. Therefore, a new water would be needed to be heated and used, and hence the consumption of electric energy would be increased, and the running cost for maintenance or the like would also be increased.

Therefore, a second object of the present invention is to provide a trap system capable of regenerating a trap unit while suppressing an equipment cost and a running cost.

According to the invention defined in claim 1, there is provided a trap apparatus disposed in a discharge passage for discharging therethrough a gas from a vacuum chamber with a vacuum pump and having a trap unit for trapping and removing a product in a discharged gas, characterized in that: the trap unit has trap passages comprising an upstream passage portion spreading outwardly from the center and a downstream passage portion directed inwardly toward the center.

In as much as the gas flows outwardly in the upstream passage portion, and then changes its direction and flows inwardly in the downstream passage portion, the gas has a greater chance of contacting the walls of the trap passages, and the trapping efficiency is increased. Because the passages are not excessively complex, the manufacturing cost and the maintenance cost are not increased, and the influence on the discharge system is small as the conductance is not excessively reduced.

According to the invention defined in claim 2, the trap passages are formed by curved surfaces. Since the passages change their direction sequentially, their trapping efficiency is higher than with straight passages.

The trap passages may be arranged in a multi-layered configuration. Guide surfaces for guiding the flow of the gas may be disposed at an inlet of the trap passages.

According to the invention defined in claim 3, a downstream portion of any one of the trap passages is partly divided into at least two passages. Therefore, the gas is kept stagnant for an increased time in the downstream portion, and can easily be brought into contact with the walls for an increased overall trapping efficiency.

According to the invention defined in claim 4, the trap unit is movable into and out of the discharge passage. At least two trap units may be prepared, and while one of the trap units is performing a trapping action, the other trap unit may be regenerated for continuous trapping operation.

According to the invention defined in claim 5, a trap apparatus disposed in a discharge passage for discharging therethrough a gas from a vacuum chamber with a vacuum pump and having a trap unit for trapping and removing a product in a discharged gas, characterized in that: the trap unit has baffle plates having arcuate trap surfaces whose axes extend across the discharge passage.

According to the invention defined in claim 6, a trap system comprising: a trap chamber disposed in a discharge passage for discharging therethrough a gas from a vacuum chamber of a semiconductor fabrication apparatus with a vacuum pump for trapping and removing a product in a discharged gas by a trap unit; a regenerating chamber disposed adjacent to the trap chamber; a switching mechanism for shifting the trap unit between the trap chamber and the regenerating chamber; and a coolant passage for introducing a coolant used to cool the semiconductor fabrication apparatus into the regenerating chamber.

The coolant which has passed through certain locations in the semiconductor fabrication apparatus and increased in temperature is supplied to the regenerating chamber, and the trap unit is efficiently cleaned by the warm coolant for continuously operating the trap apparatus stably. Since no new heat source and cleaning liquid are used, the resource saving capability and the energy saving capability are increased.

According to the invention defined in claim 7, the semiconductor fabrication apparatus comprises a vapor deposition apparatus.

BRIEF DESCRIPTION OF THE DRAWINGS

FIG. 12 is a view of a conventional trap apparatus; and

FIG. 13 is a view of another conventional trap apparatus.

BEST MODE FOR CARRYING OUT THE INVENTION

Embodiments of the present invention will be described below with reference to the drawings.

Figure 1:
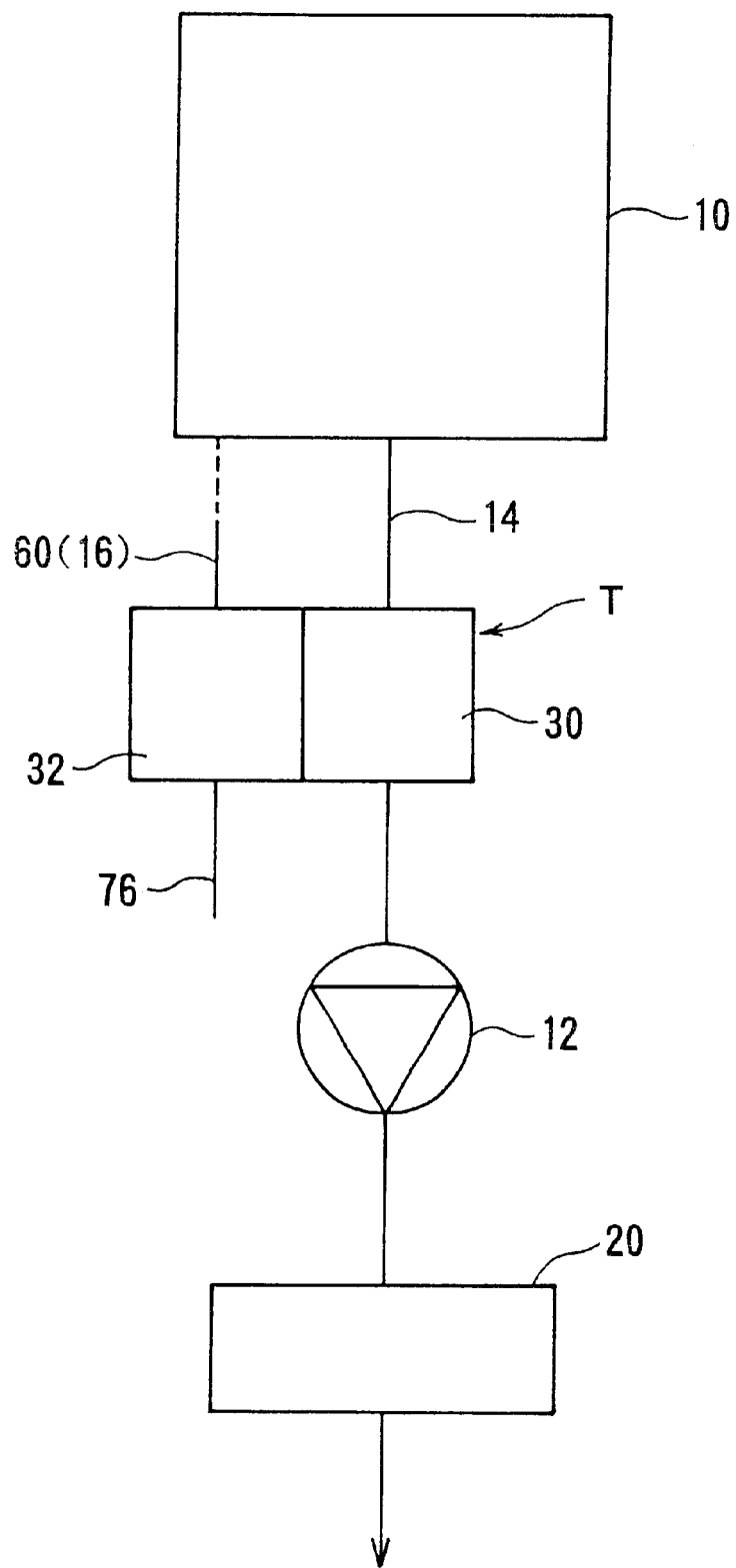
FIG. 1 is a systematic diagram showing an evacuating system having a trap apparatus and a trap system according to an embodiment of the present invention.
Figure 5:
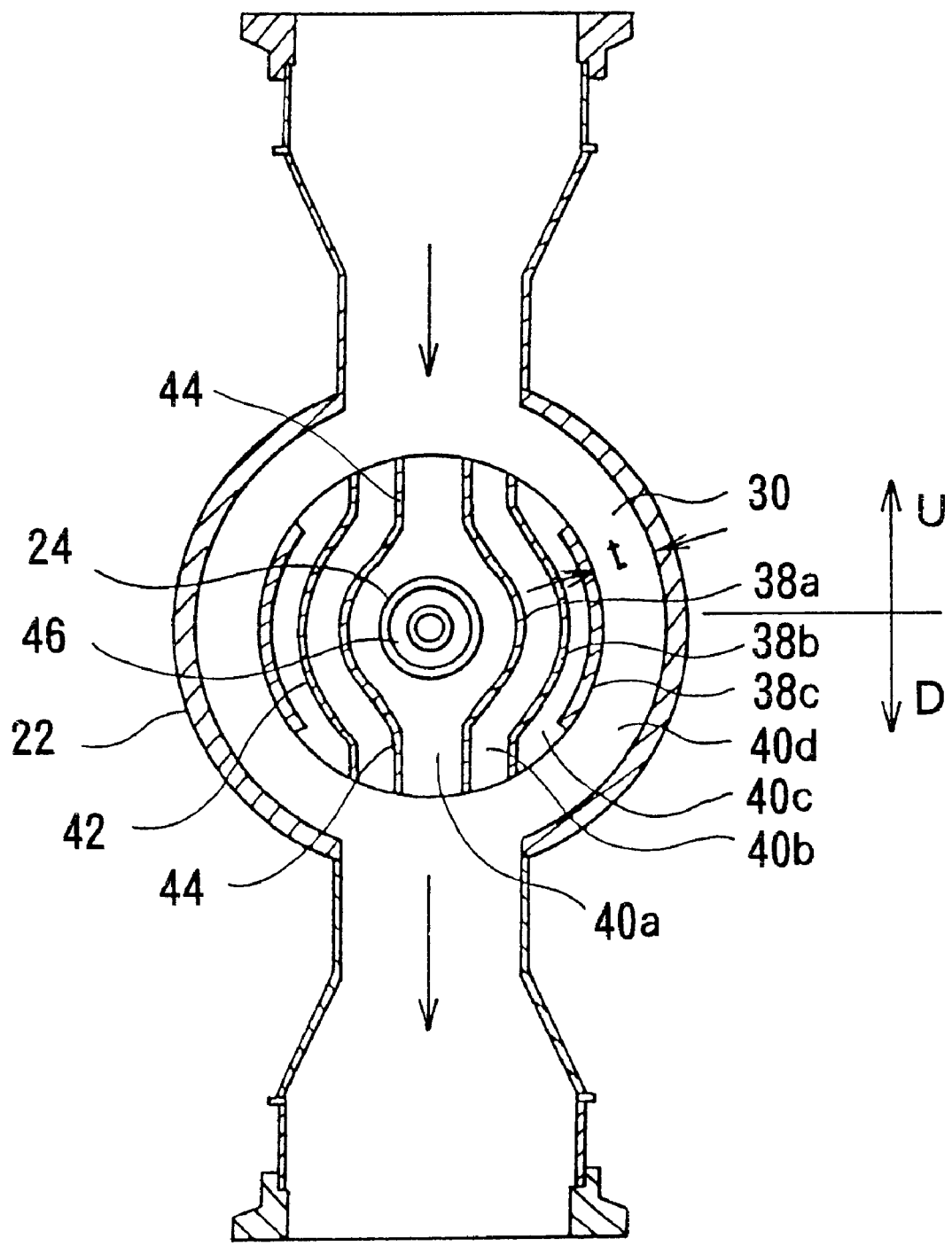
FIG. 5 is a view of the trap apparatus according to the embodiment of the present invention.
Figure 6A:
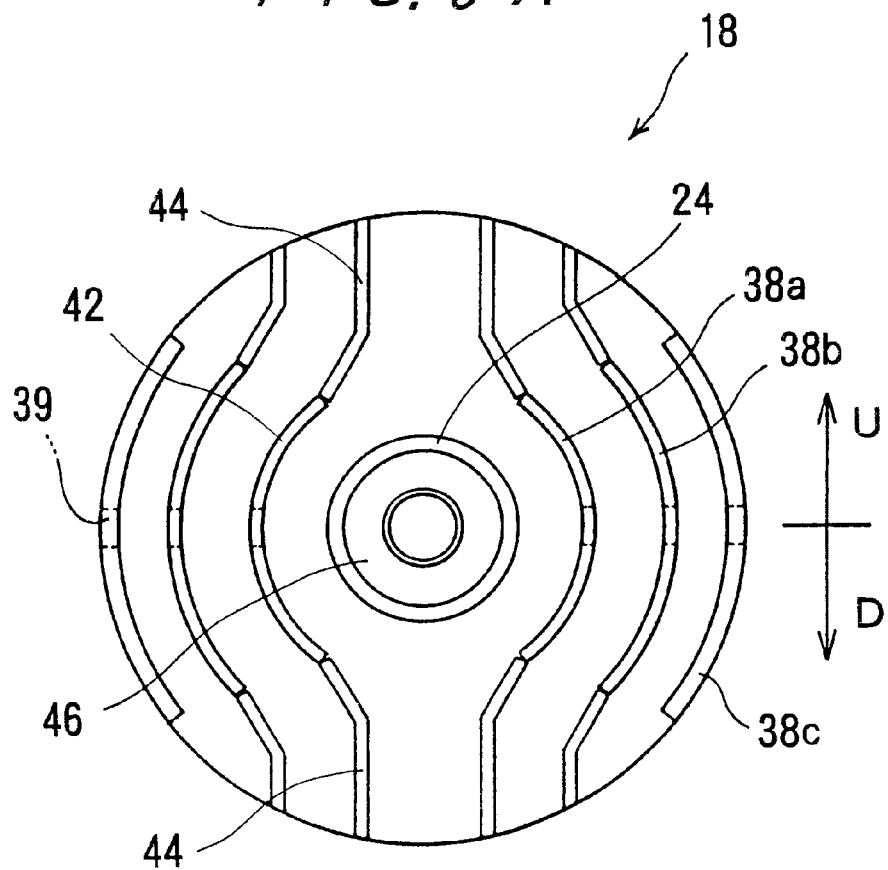
FIG. 6 is an enlarged view of the trap apparatus shown in FIG. 5.
Figure 6B:
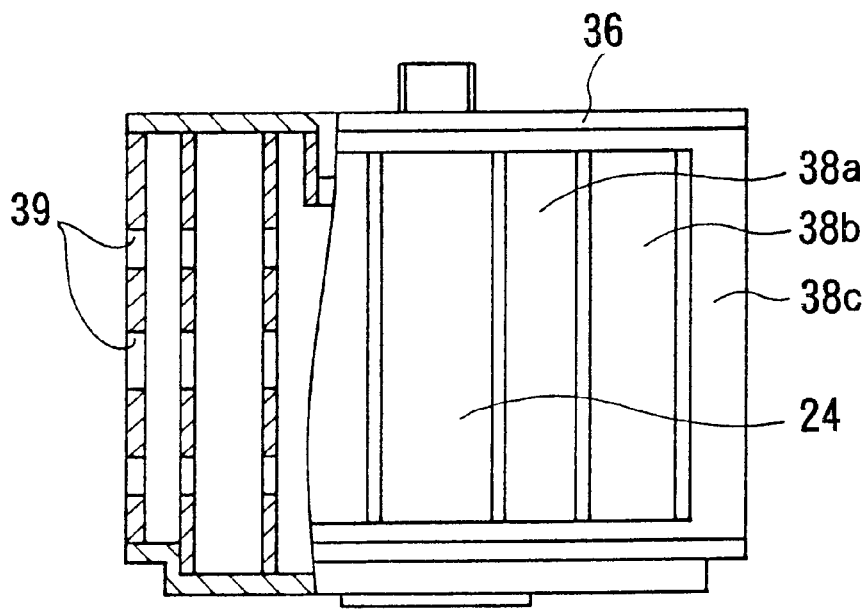
Figure 7:
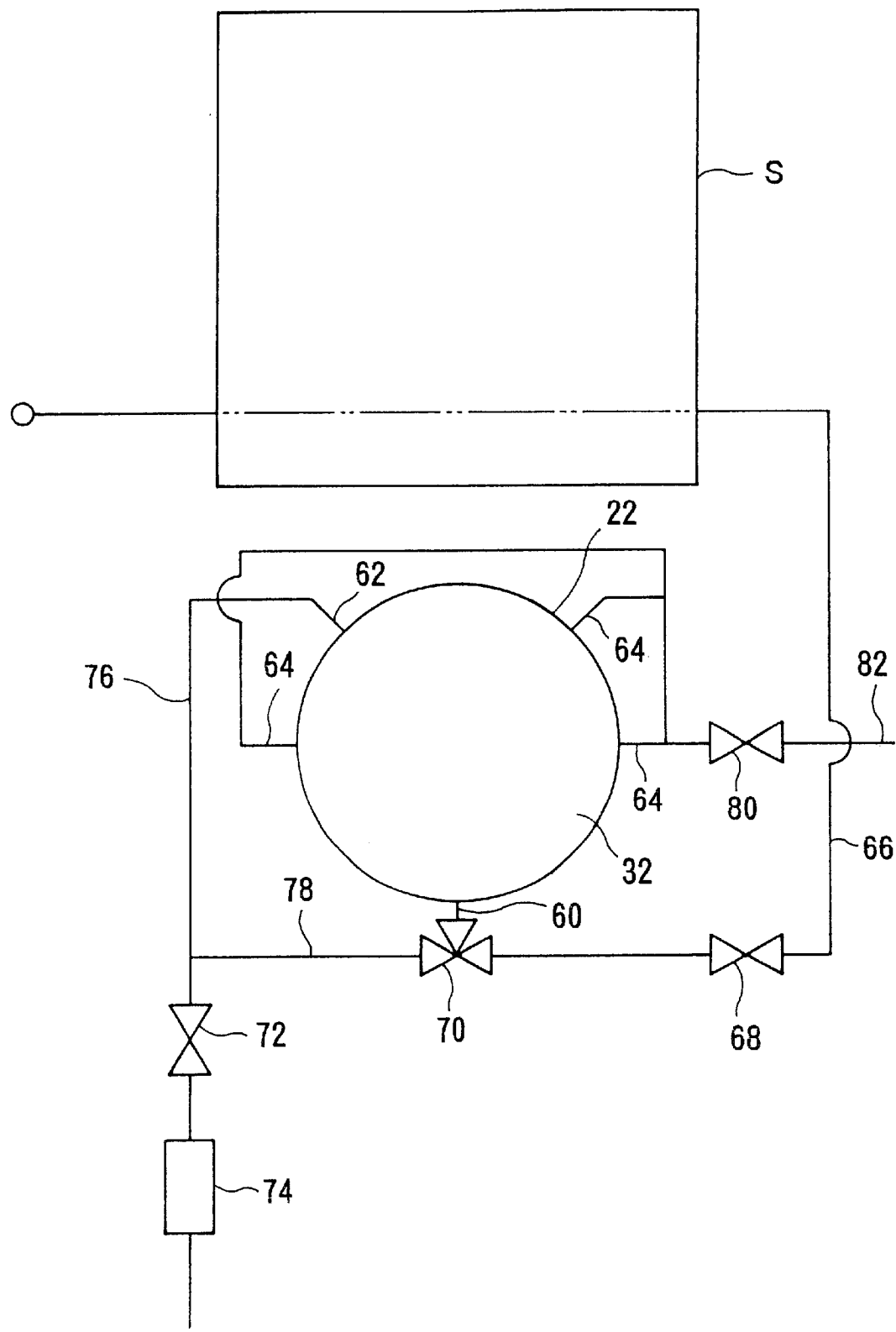
FIG. 7 is a diagram showing a piping for a cleaning liquid and a purge gas of the trap apparatus.

FIGS. 1 through 7 show a trap system according to an embodiment of the present invention. The trap system has a pipe 14 through which a CVD reaction chamber (vacuum chamber) 10 which forms part of a semiconductor fabrication apparatus is evacuated by a vacuum pump 12, and a trap apparatus T disposed upstream of the vacuum pump 12. The trap apparatus T has a regenerating pipe 16 disposed adjacent to the discharge pipe 14. A tubular casing 22 extending across the pipes 14, 16 has a trap chamber 30 and a regenerating chamber 32 defined therein. A trap unit 18 mounted on a shaft 24 is disposed in the casing 22 for linear movement in a direction across the discharge pipe 14 and the regenerating pipe 16. The trap unit 18 can be positioned alternately in the trap chamber 30 and the regenerating chamber 32 by an external switch mechanism. As shown in FIGS. 1 and 7, a discharge passage is connected to the regenerating pipe 16 for discharging a coolant used to cool the semiconductor fabrication apparatus S.

Figure 2:
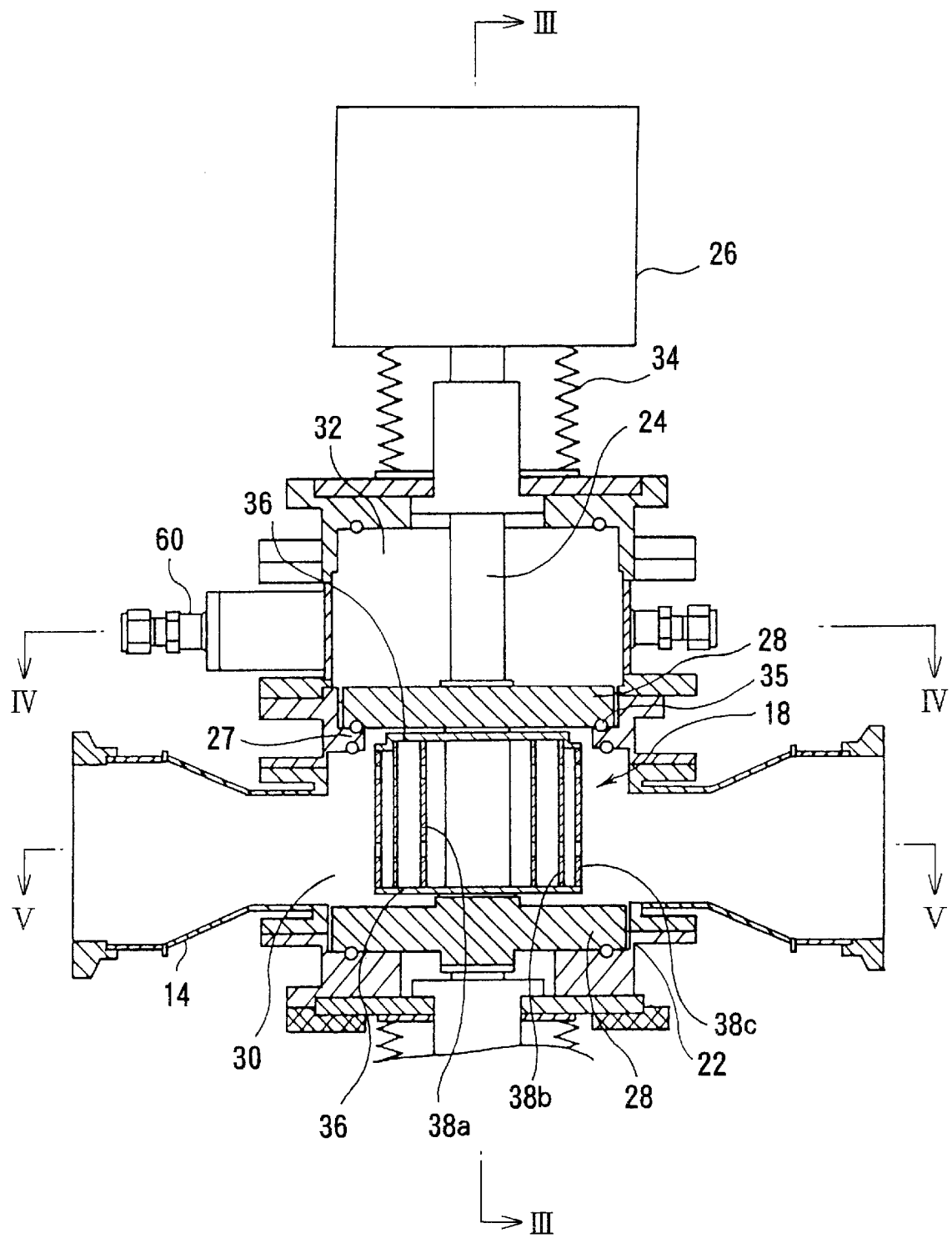
FIG. 2 is a horizontal cross-sectional view of the trap apparatus shown in FIG. 1.

As shown in FIG. 2, an air cylinder 26 as an actuating means for reciprocatingly moving the shaft 24 in its axial direction is mounted on the casing 22. The casing 22 is divided into the trap chamber 30 and the regenerating chamber 32 by a centrally open partition 27 and a separating plate 28 mounted on the shaft 24. The discharge pipe 14 and the regenerating pipe 16 are connected respectively to the trap chamber 30 and the regenerating chamber 32. A temperature sensor and a pressure sensor for indirectly detecting a trapped amount of substance are disposed at given positions in the trap chamber 30, the regenerating chamber 32, or the discharge pipe 14.

A bellows 34 is disposed between the air cylinder 26 and the casing 22 for keeping a hermetic seal therebetween. An O-ring 35 is disposed between contacting portions of the partition 27 and the separating plate 28 to keep a hermetic seal between the trap chamber 30 and the regenerating chamber 32. The separating plate 28 is made of a highly heat-insulating material to prevent heat transfer between the trap chamber 30 and the regenerating chamber 32.

As shown in FIG. 6, the trap unit 18 comprises a pair of end plates 36 mounted on the shaft 24 in axially confronting relation to each other, and baffle plates 38a, 38b, 38c extending between these end plates. The baffle plates 38a, 38b, 38c are disposed in a plurality of sets (six baffle plates in the illustrated embodiment) in a horizontal symmetric pattern, thus defining trap passages 40a, 40b, 40c, 40d having an upstream passage portion U spreading outwardly from the center and a downstream passage portion D directed inwardly toward the center. In this embodiment, each of the baffle plates 38a, 38b, 38c has an arcuate portion 42 and flat portions 44 serving as upper and lower joints.

The baffle plates 38a, 38b, 38c and the end plates 36 are made of a material having a good heat conductivity. The baffle plates 38a, 38b, 38c are cooled by heat conduction with the shaft 24 via the end plates 36. Each of the baffle plates has discharge holes 39 defined therein for discharging a deposited material for regeneration, as described later on.

The shaft 24 is made of a material having a good heat conductivity, such as metal, and has a coolant passage 46 defined therein. A heat medium for cooling comprising liquid such as liquid nitrogen, cooled air or water is supplied to the coolant passage 46.

Figure 4:
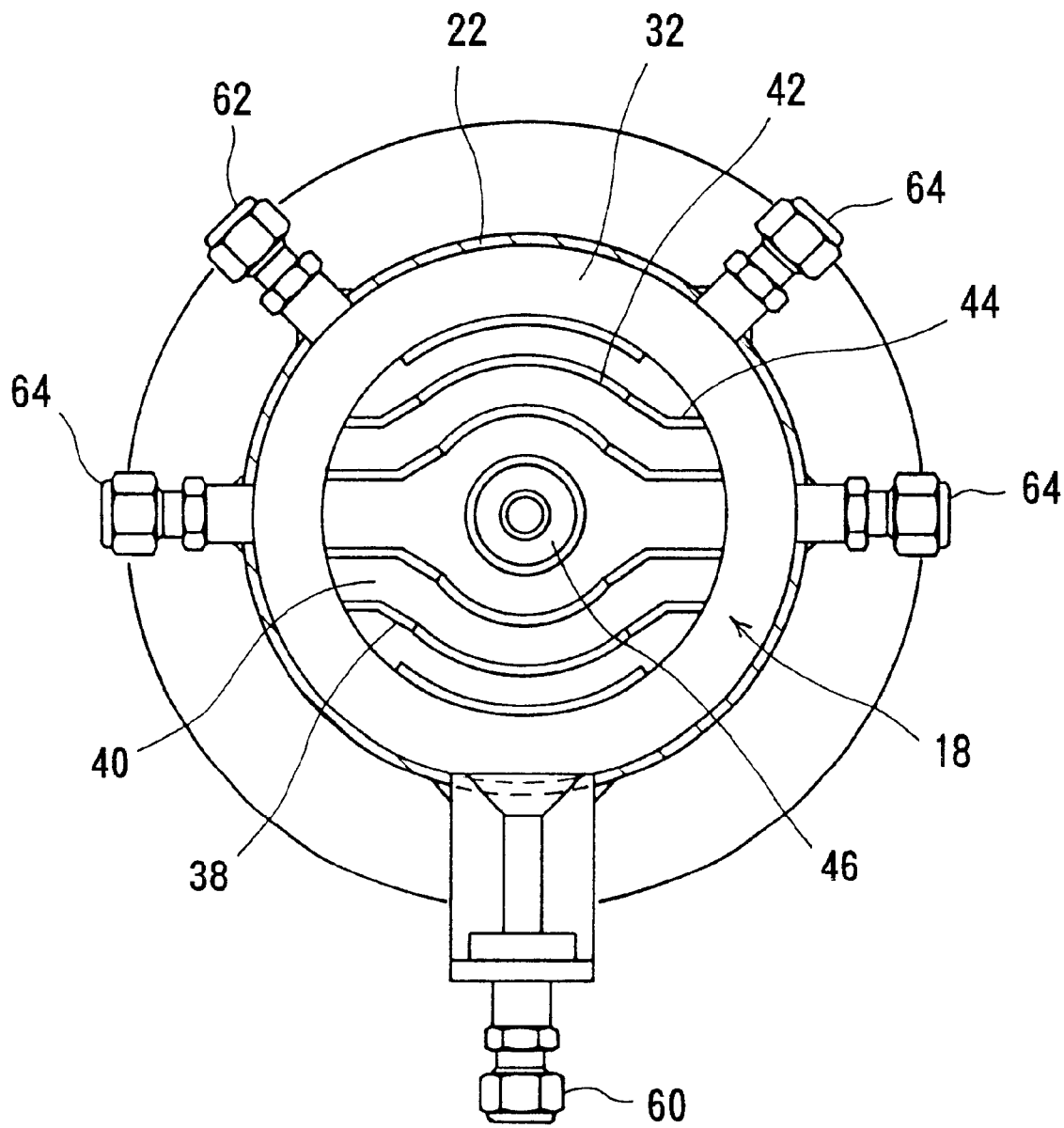
FIG. 4 is a view taken along line IV—IV of FIG. 2.

As shown in FIG. 4, the regenerating chamber 32 has a cooling liquid inlet/outlet port 60 defined in a lower portion thereof for introducing and discharging a cooling liquid, a cooling liquid outlet port 62 defined in an upper portion thereof for discharging a cooling liquid, and three gas purge ports 64 for introducing and discharging a drying purge gas. As shown in FIG. 7, a discharge passage (cleaning liquid supply passage) 66 for discharging a coolant used to cool the semiconductor fabrication apparatus S is connected to the cooling liquid inlet/outlet port 60 via a three-way directional control valve 70 and a valve 68. If the semiconductor fabrication apparatus S comprises a CVD apparatus, then a coolant for the wall of the vacuum chamber 10, a gas ejection head, a substrate holder base, etc., or a coolant for an evaporator or other ancillary equipment can be used.

A cleaning liquid discharge passage 76 which has a valve 72, and a pump or ejector 74 for discharging a cleaning liquid is connected to the cooling outlet port 62. A bypass passage 78 extending from the three-way directional control valve 70 is joined to the cleaning liquid discharge passage 76. A purge gas passage 82 connected to an $N_2$ gas source, for example, via a valve 80 is connected to each of the gas purge ports 64.

Operation of the trap apparatus T thus constructed will be described below. In a CVD process, as shown in FIG. 2, the trap unit 18 is switched over so as to be positioned in the trap chamber 30, with the baffle plates 38 being cooled by a coolant flowing through the coolant passage 46. When the vacuum pump 12 is operated, a gas discharged from the chamber 10 is introduced via the discharge pipe 14 into the casing 22. As shown in FIG. 5, the discharged gas flows along the curved trap passages 40a, 40b, 40c between the baffle plates 38a, 38b, 38c, and is cooled upon collision with the baffle plates 38a, 38b, 38c. Components in the discharged gas which can easily be coagulated are deposited thereon, and the deposited solid substance is attached to inner and outer surfaces of the baffle plates.

Since the baffle plates 38a, 38b, 38c are curved, there is a high probability that gas molecules in the discharged gas hit the trap surfaces, and the efficiency of the cooled and trapped gas molecules is improved. This trapping action is effectively not only for trapping gas molecules by cooling, but also for trapping particles on the trap surfaces by adsorption. If a particular component contained in the discharged gas flowing along the discharge pipe 14, e.g., aluminum, is deposited, then a component such as aluminum chloride is attached and trapped as a solid substance and hence removed from the exhaust gas.

Figure 3:
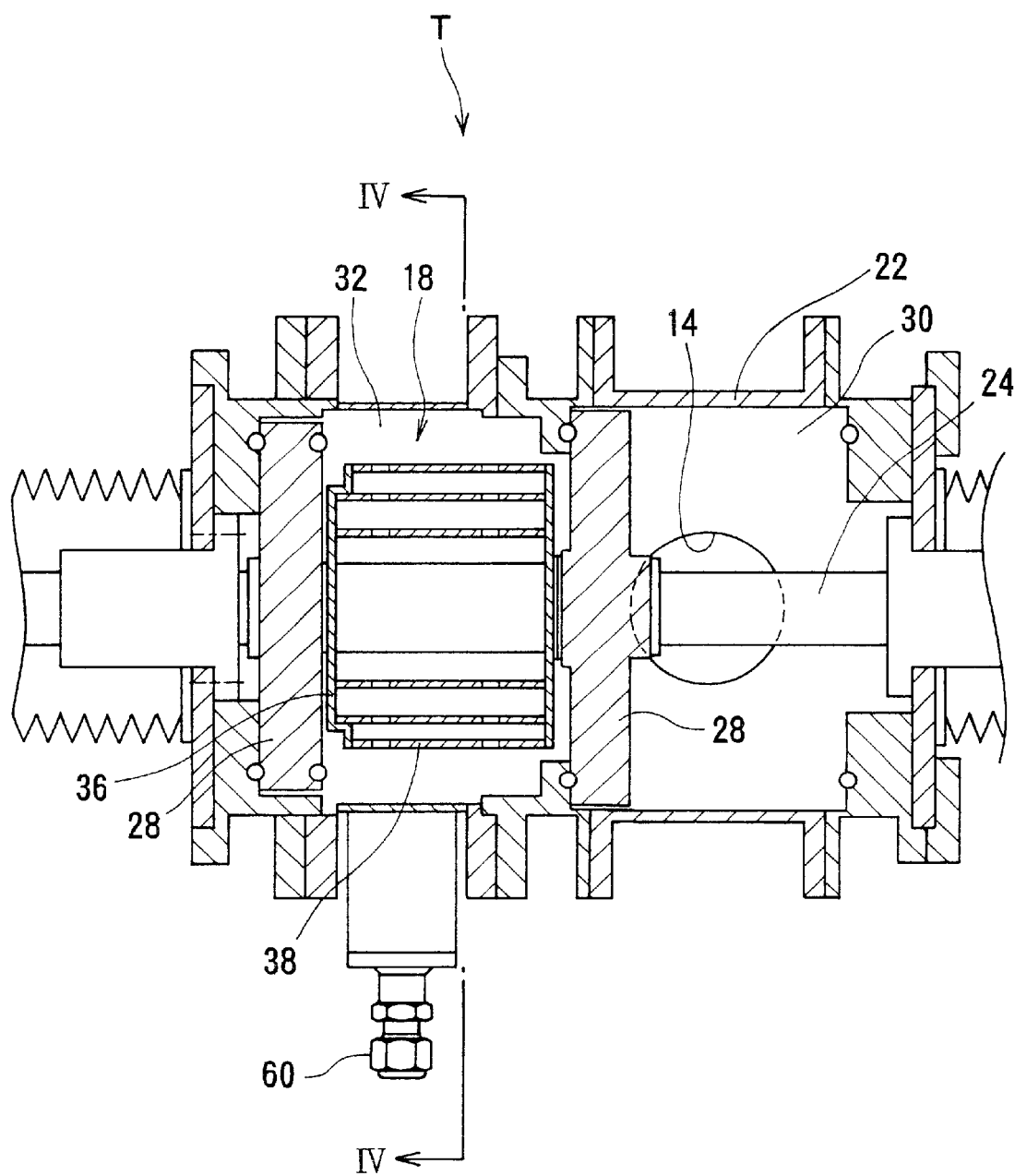
FIG. 3 is a view taken along line III—III of FIG. 2.

After treatment for a certain period of time, or when a certain trapped amount of substance is detected by the temperature sensor or the pressure sensor, the process is temporarily stopped, or the discharge pipe 14 is switched to another trap passage. Then, the air cylinder 26 is operated to move the trap unit 18 into the regenerating chamber 32, as shown in FIG. 3. The valve 68 is opened, and the three-way directional control valve 70 is shifted to connect the port 60 to the passage 66 for introducing the coolant (cleaning liquid) used to cool the semiconductor fabrication apparatus S and warmed into the regenerating chamber 32. At the same time, the valve 72 of the cleaning liquid discharge passage 76 is opened.

The coolant (cleaning liquid) which has been warmed to about 40° C. flows from the lower port 60 into the regenerating chamber and fills the regenerating chamber to thus submerge the trap unit 18. The produced substance attached to the trap unit 18 is now dissolved into the cleaning solution, and separated from the trap unit 18 and floats in the cleaning solution under the force of the flow of the cleaning solution. The cleaning solution which has dissolved or floated the produced substance is then discharged from the cooling liquid outlet port 62. Since the cleaning liquid flows continuously into the regenerating chamber 32, the regenerating chamber 32 is always filled with the new cleaning liquid.

When the cleaning process for a given period of time is finished, the three-way directional control valve 70 is shifted to connect the port 60 to the bypass passage 78 to discharge the cleaning liquid which has been filled in the regenerating chamber 32. Then, the valve 80 of the purge gas passage 82 is opened to introduce a dry $N_2$ gas from the gas purge ports 64, thus drying the trap unit 18 and the regenerating chamber 32. Thereafter, the trap unit 18 is returned to the trap chamber 30. The trapping operation can thus be resumed without introducing water into the discharge pipe 14. The valves 68, 80 are closed unless the regenerating process is carried out, so that no water enters the discharge pipe 14 when the trap unit 18 moves between the trap chamber 30 and the regenerating chamber 32.

If the attached substance cannot easily be separated due to its attachment condition and its properties, then the cleaning liquid may be introduced in many directions from the gas purge ports 64 used as cleaning liquid inlets, or after the cleaning liquid is filled in the regenerating chamber 32, an $N_2$ gas or air may be supplied from the ports 60, 62, 64 to cause bubbling in the cleaning liquid for thereby moving the cleaning liquid to physically separate the attached substance. Alternatively, the cleaning liquid may be pressurized by a suitable process and ejected to the trap unit 18.

An experiment conducted by the inventor has confirmed that when the trap apparatus T was installed in the discharge passage of the vacuum chamber of an LP-CVD apparatus and $NH_4Cl$ was trapped by the trap unit 18, the cleaning efficiency of 100% (the remainder of $NH_4Cl$ was 0%) was achieved by cleaning the trap unit 18 for 20 minutes.

A trap unit according to another embodiment will be described below. A trap unit 18 shown in FIG. 8 has a plurality of arcuate baffle plates 38a, 38b, 38c, 38d, 38e which are disposed in surrounding relation to a shaft 24 and define curved trap passages 40a, 40b, 40c, 40d therebetween in a multi-layer configuration. The trap passages have an upstream inlet 50 and an outlet 52. The inlet 50 is widely open at an obtuse angle and the outlet 52 is narrowly open for sufficiently keeping a gas stagnant in the downstream side of the trap unit 18 for an increased trapping time.

The inlet 50 has guide baffles 54b, 54c, 54d disposed therein for distributing the gas flowing centrally into peripheral passages. The guide baffles 54b, 54c, 54d are formed as part of the arcuate baffle plates 38c, 38d, 38e, i.e., by axially slitting cylindrical baffle plates. However, the guide baffles 54b, 54c, 54d should not be limited to such a structure. In this embodiment, the guide baffles 54b, 54c, 54d are alternately arranged along the flow for an increased gas distribution capability.

In this manner, the plural concentric trap passages 40a, 40b, 40c, 40d are formed in the trap unit 18. Outer ones of the trap passages are longer and hence have larger trap areas. Therefore, the overall trapping efficiency can be increased by distributing the gas into outer trap passages which have larger trap areas. Since the distribution of the gas into the passages can be adjusted by the conductance of each of the passages, the distribution of gas flow rates can be adjusted by making outer passages wider than inner passages.

Figure 9A:
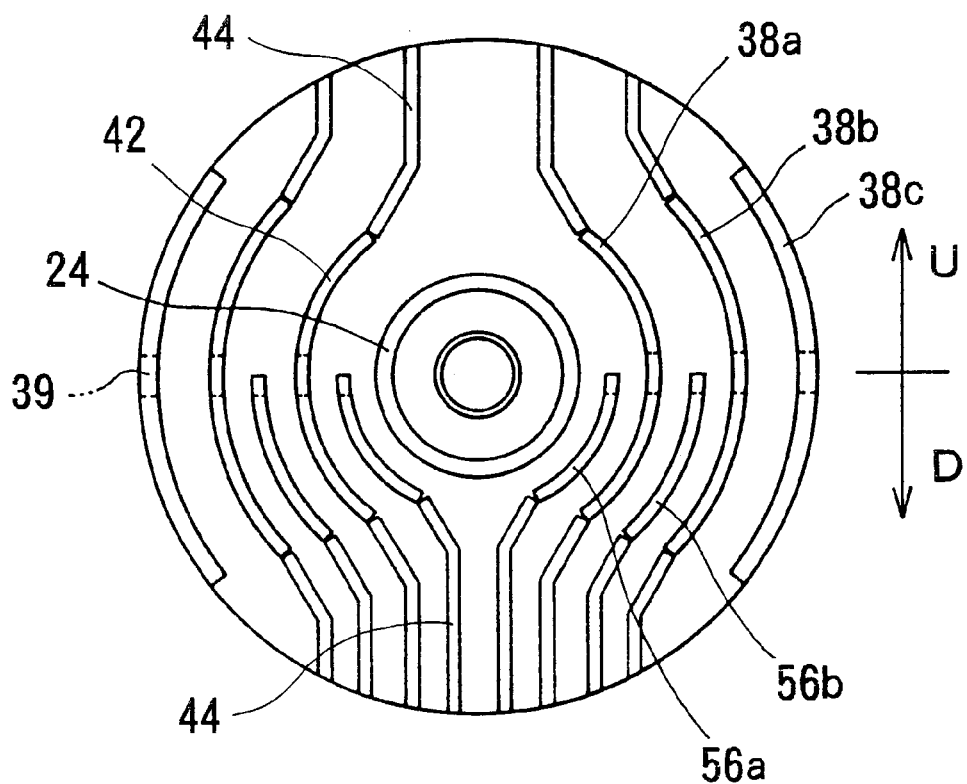
FIG. 9 is a view of a trap unit according to still another embodiment.
Figure 9B:
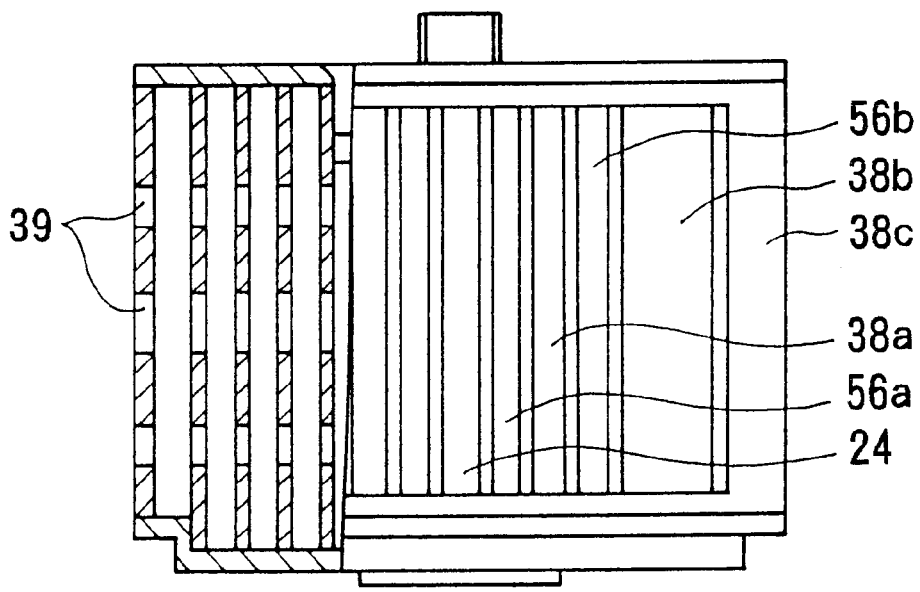

FIG. 9 shows an embodiment which is an improvement of the trap unit shown in FIG. 6. Dividing baffle plates 56a, 56b each for dividing each passage are inserted in downstream portions of the trap passages 40a, 40b, thus reducing the widths of the passages for sufficiently making the gas stagnant in those passages. This structure is effective in providing an increased trapping time in the downstream passage portions where the flow of the gas is stable for increasing the overall trapping efficiency, without excessively lowering the conductance as compared with an attempt to reduce the width of all the passages.

Figure 10A:
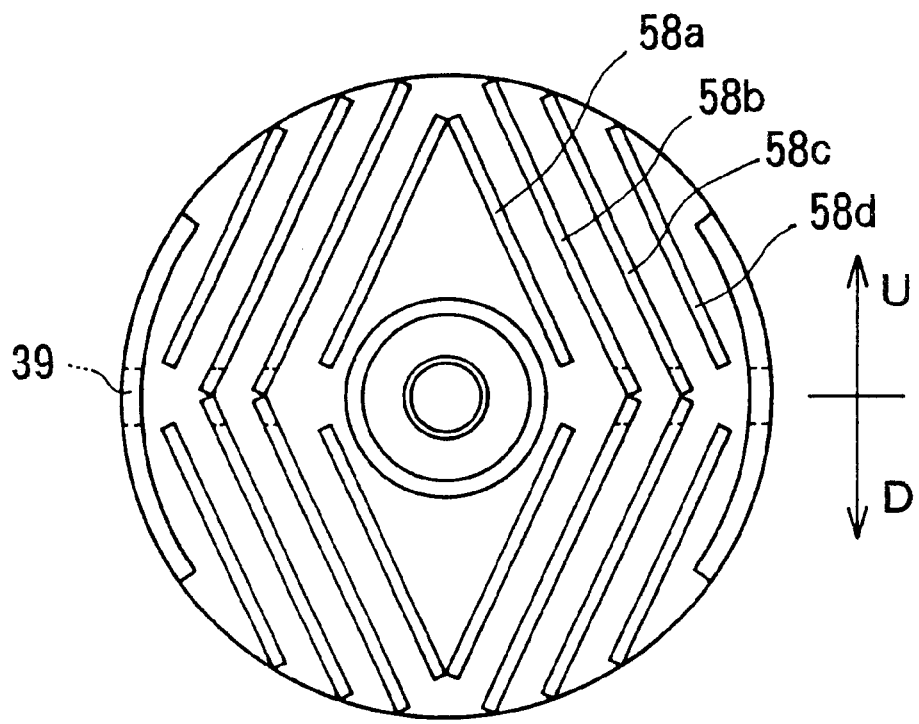
FIG. 10 is a view of a trap unit according to still another embodiment.
Figure 10B:
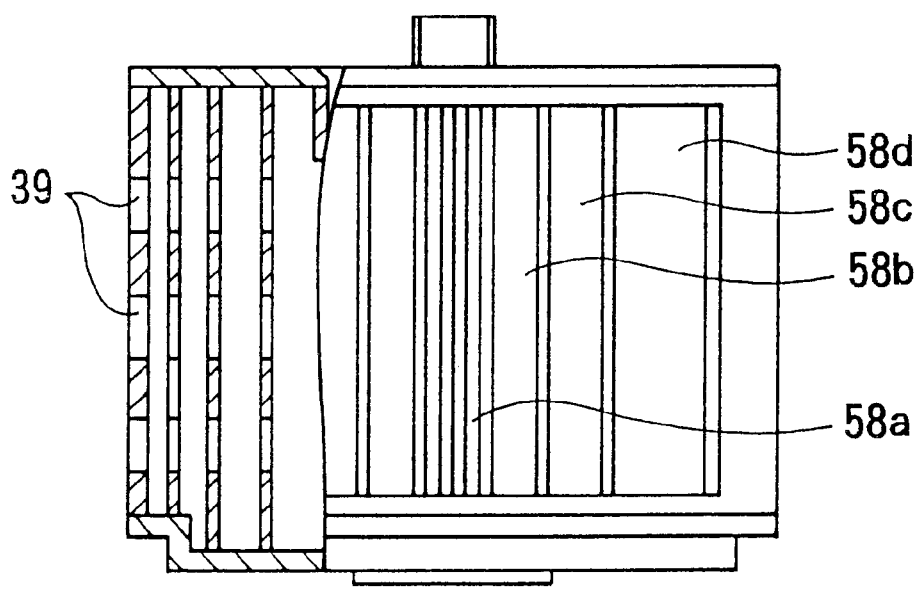
Figure 11:
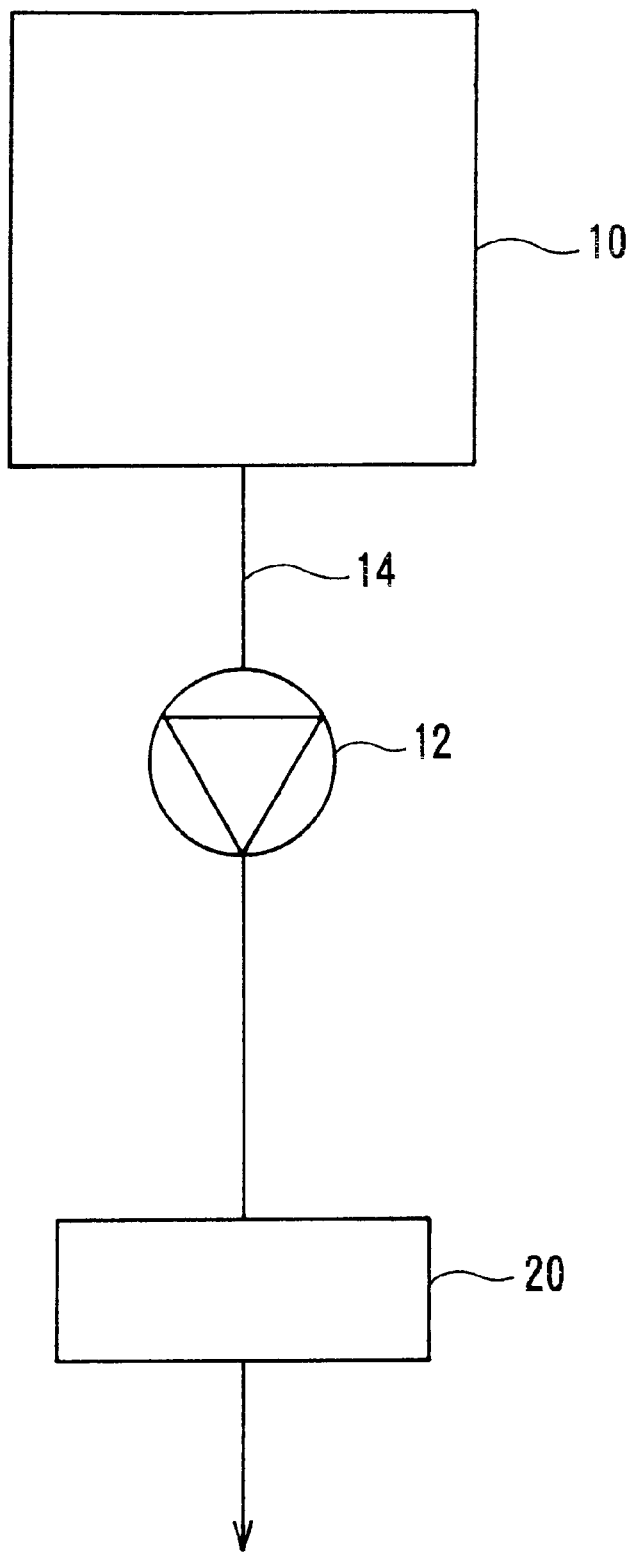
FIG. 11 is a diagram showing an evacuating system employing a conventional trap system.

FIG. 10 shows a trap unit according to still another embodiment of the present invention. This trap unit differs from the embodiment shown in FIG. 6 in that each of the upstream passage portion U spreading outwardly from the center and the downstream passage portion D directed inwardly toward the center comprises flat baffle plates 58a, 58b, 58c, 58d. In this embodiment, the baffle plates can easily be machined, are relatively low in cost, and yet provides the same operation and advantages as those of the above embodiments. In this embodiment, the guide baffles shown in FIG. 8 and the dividing baffle plates shown in FIG. 9 may be employed.

Although only one regenerating pipe is provided in the above embodiments, regenerating pipes may be disposed one on each side of the discharge pipe, and two trap units may be symmetrical with respect to the shaft. While one of the trap units performs a trapping action, the other trap unit may be regenerated for continuous trapping operation. In the above embodiments, the trap unit 18 is linearly movable in the casing for conducting switching. However, the casing may be of an annular shape, and the trap unit may be angularly moved through rotary motion. In this case, three or more trap units may be provided for one discharge passage, and may be simultaneously regenerated via two or more regenerating and cleaning passages. Usually, since the regenerating rate of regenerating trap units is lower than the rate of trapping, the above modification is particularly advantageous. The rotary motion arrangement may have one regenerating passage even if there are two trap units.

The conventional trap apparatus and the trap apparatus with baffles according to the present invention were used to conduct an experiment for trapping NH$_4$Cl. The resultant trapping efficiencies are compared in Table 1 below.

TABLE 1

Figure 8A:
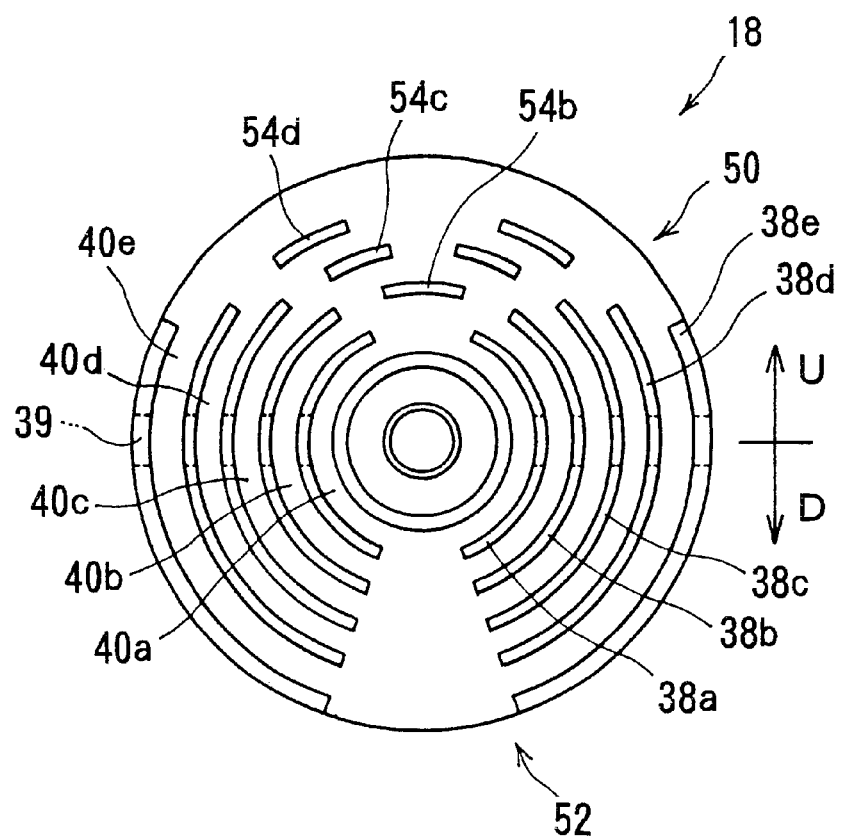
FIG. 8 is a view of a trap unit according to another embodiment.
Figure 8B:
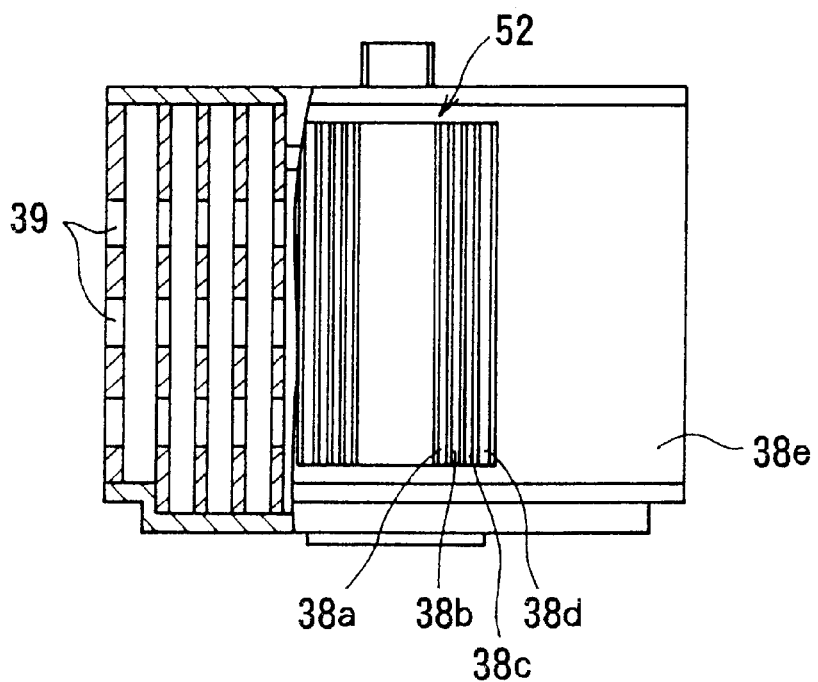

| Baffle shapes | FIG. 6 | FIG. 8 | FIG. 9 | FIG. 12 | FIG. 13 |
|---|---|---|---|---|---|
| Efficiency (%) | 61.4 | 38.4 | 47.4 | 19.0 | 7.0 |

It has been found that the trapping efficiency in the shape shown in FIG. 6 is high. The conductance after the trapping action using the combination of the baffles and the chambers was 42200 (L/min) (achieved value), and did not affect the process at all.

As described above, in the first embodiment of the present invention, the trapping efficiency can be increased without excessively lowering the conductance, and the service life of the vacuum pump is increased and a toxic substance removing device is protected for increased operation reliability of the evacuating system without affecting the performance of the vacuum pump in the evacuating system, so that the productivity of semiconductor fabrication can be increased.

According to the other embodiments, the coolant which has passed through certain locations in the semiconductor fabrication apparatus and increased in temperature is supplied to the regenerating chamber, and the trap unit is efficiently cleaned by the warm coolant for continuously operating the trap apparatus stably. Since no new heat source and cleaning liquid are used, the resource saving capability and the energy saving capability are increased, with the result that the trap unit can be regenerated while suppressing the equipment cost and the running cost.

INDUSTRIAL APPLICABILITY

The present invention is useful, for example, as an evacuating system for evacuating a vacuum chamber of a semiconductor fabrication apparatus and a trap apparatus for use in the evacuating system.

What is claimed is:

1. A trap apparatus disposed in a discharge passage for discharging therethrough a gas from a vacuum chamber with a vacuum pump, said trap apparatus comprising;

a trap unit for trapping and removing a product in a discharged gas, wherein said trap unit contains trap passages comprising an upstream passage portion spreading outwardly from a center-line of the trap unit and a downstream passage portion directed inwardly toward the center-line of the trap unit, wherein said trap passages are provided on opposite sides with respect to said center-line, and wherein said passages are defined by baffle plates having portions with a shape selected from at least one of an arcuate shape and a flat shape, each of said portions extending across the flow of discharged gas such that the flat shaped portions of the baffle plates have their flat surfaces parallel with the flow of discharged gas.

2. A trap apparatus according to claim 1, wherein said trap unit is movable into and out of said discharge passage.

3. A trap apparatus disposed in a discharge passage for discharging therethrough a gas from a vacuum chamber with a vacuum pump, said trap apparatus comprising;

a trap unit for trapping and removing a product in a discharged gas, wherein said trap unit contains trap passages comprising an upstream passage portion spreading outwardly from a center-line of the trap unit and a downstream passage portion directed inwardly toward the center-line of the trap unit, wherein said trap passages are provided on opposite sides with respect to said center-line, and wherein said trap passages are formed by baffle plates having arcuate surfaces, each of said baffle plates extending across the flow of discharged gas.

4. A trap apparatus disposed in a discharge passage for discharging therethrough a gas from a vacuum chamber with a vacuum pump and having a trap unit for trapping and removing a product in a discharged gas, characterized in that:

said trap unit has trap passages comprising an upstream passage portion spreading outwardly from a center and a downstream passage portion directed inwardly toward the center, wherein a downstream portion of any one of the trap passages is partly divided into at least two passages.

* * * * *